United States Patent
Mabanta et al.

(10) Patent No.: US 7,106,602 B2
(45) Date of Patent: Sep. 12, 2006

(54) SWITCHING-BURSTING METHOD AND APPARATUS FOR REDUCING STANDBY POWER AND IMPROVING LOAD REGULATION IN A DC—DC CONVERTER

(75) Inventors: Samuel P. Mabanta, Pasig (PH); Donnifer Reyes, Rizal (PH); Mirasol Ponce, Mandaluyong (PH)

(73) Assignee: Astec International Limited, (HK)

( * ) Notice: Subject to any disclaimer, the term of this patent is extended or adjusted under 35 U.S.C. 154(b) by 186 days.

(21) Appl. No.: 10/902,228

(22) Filed: Jul. 28, 2004

(65) Prior Publication Data

US 2005/0024895 A1     Feb. 3, 2005

Related U.S. Application Data

(60) Provisional application No. 60/491,176, filed on Jul. 29, 2003.

(51) Int. Cl.
*H02M 3/338* (2006.01)
(52) U.S. Cl. .................................. 363/18; 363/131
(58) Field of Classification Search .................. 363/18, 363/19, 97, 131
See application file for complete search history.

(56) References Cited

U.S. PATENT DOCUMENTS

| | | | |
|---|---|---|---|
| 4,903,182 A * | 2/1990 | Pilukaitis et al. ............. | 363/19 |
| 4,958,268 A * | 9/1990 | Nagagata et al. ............. | 363/16 |
| 5,706,183 A * | 1/1998 | Abe et al. ...................... | 363/18 |
| 5,978,235 A | 11/1999 | Lampinen ..................... | 363/21 |
| 6,072,702 A | 6/2000 | Nakao et al. .................. | 363/19 |
| 6,285,566 B1 | 9/2001 | Nakahira et al. ............. | 363/19 |
| 6,480,401 B1 | 11/2002 | Tang ........................ | 363/21.02 |
| 6,525,948 B1 | 2/2003 | Hsu ........................ | 363/56.11 |
| 6,532,159 B1 | 3/2003 | Nishida et al. .......... | 363/21.16 |
| 6,608,768 B1 | 8/2003 | Sula ............................ | 363/18 |

* cited by examiner

*Primary Examiner*—Jeffrey Sterrett
(74) *Attorney, Agent, or Firm*—Nixon Peabody LLP

(57) ABSTRACT

A circuit and corresponding method for reducing standby power and improving no-load to full-load regulation for ringing choke converters by maintaining a reduced duty cycle, with longer off time at no-load, while maintaining the output voltage swing closer to the full-load level. This reduced duty cycle prevents the output voltage from swinging high with respect to the full-load level, thereby providing good no-load and full-load output regulation in open feedback loop systems. The circuit and method provides very low no-load switching frequency and duty cycle by increasing the off time of the main switch through use of a turn off transistor driven by a zener diode, thereby maintaining conduction even with a very small control current and prolonging the off time of the main switch. The circuit and method achieves the benefits preferably using only less costly basic discrete converter components instead of more costly integrated circuits.

22 Claims, 6 Drawing Sheets a) No Load b) @ Rated Load

SWITCHING-BURSTING METHOD AND APPARATUS FOR REDUCING STANDBY POWER AND IMPROVING LOAD REGULATION IN A DC—DC CONVERTER

CROSS REFERENCE TO RELATED APPLICATION

This application claims the benefit of U.S. Provisional Application No. 60/491,176, filed Jul. 29, 2003, which is incorporated by reference herein.

FIELD OF INVENTION

The present invention relates to power converters, and more particularly, to a circuit and corresponding method for reducing standby power and improving no-load to full-load regulation for a DC-DC converter.

BACKGROUND OF THE INVENTION

Many electronic devices utilizing low power converters typically have no on/off switch and are frequently left permanently "plugged-in" to a wall socket. The "standby" power consumption, e.g., when the equipment is off and the batteries are fully charged, of low power converters places a significant load on the public electricity supply. Such concerns have prompted the European Commission Code of Conduct on Efficiency of External Power Supplies, for example, to commit signatories thereto to achieve a no-load power consumption maximum of 300 mW by 2005. Environmental and economic considerations therefore make it desirable to significantly reduce the standby power of low power converters. In addition to reducing the standby power, it is also desirable to maintain good load regulation for the power converter such that the difference between the output voltage at standby and at full-load is minimized.

Conventional low power converters designed for open-loop operation typically exhibit poor output voltage regulation and significantly high power losses at no-load. In order to overcome this drawback, integrated circuit solutions have been implemented for prior art converters to improve output voltage load regulation and to lower standby power consumption. FIG. 1 illustrates a prior art power converter 10 designed for open-loop operation. An input AC voltage from an external AC source (not shown) is typically transformed through a diode bridge 8 into DC power at input terminals 12 and 14. As seen in FIG. 1, power converter 10 is a DC-DC ringing choke converter (hereinafter referred to as an RCC). As is well known in the art, in a conventional RCC, a main switch is connected to a primary winding of a transformer and an output is supplied to the secondary winding through self-oscillation. At a rated load, the conduction time of the main switch is prolonged so as to provide a fixed load current. In a standby lower power or no-load condition, the required load current is minimal, so conventionally, the frequency of the main switch is increased in order to shorten the conduction time accordingly. As the switching frequency for the main switch is increased, however, the switching loss for the power converter also increases. As a result, there is an undesirably high no-load standby power consumption for the conventional power converter.

As seen in FIG. 1, the power converter 10 includes a transformer 56 having a primary winding 66, a secondary winding 68, and an auxiliary winding 20. One end of a primary winding 66 is connected to the input terminal 12 to which the input DC voltage is coupled. The other end of the primary winding 66 is connected to the collector of a main switch 46. Main switch 46 is typically an NPN transistor, as shown in FIG. 1. Alternatively, main switch 46 may be a MOSFET or other suitable switching element. The emitter of main switch 46 is coupled through a resistor 44 to negative input terminal 14. The output of secondary winding 68 is connected to the output terminals 62 and 64 of converter 10 via a rectifying/smoothing circuit that includes a diode 58 and a capacitor 60 connected in a conventional way.

In operation, energy is stored in primary winding 66 during the on time of main switch 46. The on time of main switch 46 is controlled by the signal coupled to the base of main switch 46, i.e., its control input. The auxiliary winding 20 has the same polarity as primary winding 66. One end of auxiliary winding 20 is connected to negative input terminal 14. A resistor 22 is connected in series with a capacitor 24 between the base of main switch 46 and the other end of auxiliary winding 20.

A switch 30 is coupled between input terminal 14 and the control input of main switch 46. Switch 30 is typically a NPN transistor having an emitter connected to input terminal 14. A capacitor 32 is connected across the base and emitter of transistor 30. A resistor 42 is connected in series between the base of transistor 30 and the junction of a resistor 44 and the emitter of main switch 46. A capacitor 36 is connected in parallel with a resistor 38, between a node 75 and input terminal 14. A resistor 26 is connected in series with a diode 34 between node 75 and the end of auxiliary winding 20. The diode 34 has an anode connected to node 75 and a cathode connected to resistor 26. A zener diode 40 has an anode connected to node 75 and a cathode connected to the base of main switch 46. The power converter 10 includes a starting resistor 18 connected in series between input terminal 12 and the control input of main switch 46.

In operation, at start up of converter 10, the input DC voltage provided at the input terminals charges capacitor 16 and a current results through starting resistor 18 that charges the base of main switch 46. When the voltage difference between the base and emitter ($V_{be}$) of main switch 46 exceeds a predetermined threshold, typically 0.6V, main switch 46 is switched on. As a result, the current through main switch 46 is coupled to primary winding 66, where energy is stored.

The conduction state of main switch 46 causes a voltage to develop across resistor 44. The voltage signal across resistor 44 is coupled to the base of switch 30. Switch 30 is switched into a conduction state when there is sufficient charge at the base. The conduction state of switch 30 causes switch 46 to turn off. As a result, the energy from primary winding 66 is transferred to secondary winding 68 and auxiliary winding 20 is charged. The energy from secondary winding 68 is coupled, through the rectifying/smoothing circuit formed by diode 58 and capacitor 60, to output terminals 62, 64. When the energy from secondary winding 68 is depleted, the voltage across auxiliary winding 20 reverses direction. Switch 46 is turned on through build-up of the potential across auxiliary winding 20, enabling the cycle to repeat.

At a low-load or no-load condition for converter 10, the control by switch 30 of the switching of main switch 46 diminishes. For the operation of converter 10 under a no-load condition, energy conversion is done by the switching action of main switch 46 driven by the collapse and build-up of the voltage potential across auxiliary winding

20. The output voltage, $V_o$, at a no-load level is limited approximately in accordance with the following formula:

$$V_o = (N_s/N_c) * (V_{z40} + V_{be})$$

where $N_s$ is the number of turns of secondary winding 68, $N_c$ is the number of turns of auxiliary winding 20, and $V_{z40}$ is the voltage across zener diode 40. Zener diode 40 draws a portion of the supply current of auxiliary winding 20 in order to control the base current of main switch 46, thereby controlling its turn on time ($T_{on}$) in order to limit $V_o$ more specifically according to the following formula expressing $V_0$ as a function of the turn on and turn off time:

$$V_o = (N_s/N_p) * V_{in} * (T_{on}/T_{off})$$

where $V_{in}$ is the input DC voltage, $N_p$ is the number of turns of primary winding 66, and $T_{off}$ is the turn off time of main switch 46.

Main switch 46 starts to turn off as the voltage difference between the voltage across zener diode 40 and the voltage across capacitor 36 falls below the proper $V_{be}$ level for main switch 46. At a no-load condition, faster switching occurs since $dt = L_p(di)/V_{in}$ with very small (di); where $L_p$ is the inductance of the primary winding 66. The higher the switching frequency of main switch 46, the higher the switching loss for power converter 10. As a result, the no-load standby power consumption for power converter 10 is significantly high, above the European Commission standard of 300 mW referenced above. In addition, since the switching of main switch 46 is uninterrupted for power converter 10, the output voltage, $V_o$, continues rising as the load is decreased since zener diode 40 will be more accurate due to the decreased voltage spikes at auxiliary winding 20. As a result, there is a large difference between the output voltage at no-load and at full-load for power converter 10. Thus, in addition to the substantial power consumption at standby or no-load, power converter 10 exhibits poor voltage regulation.

A need therefore exists for a circuit and corresponding method for reducing standby power and improving no-load to full-load regulation for ringing choke converters. There is especially a need such a circuit and method in open-loop systems. There is also a need for a circuit for providing reduced standby power and improved regulation through the use of simple, less costly discrete components.

SUMMARY OF THE INVENTION

The present invention solves the problems of prior art devices by providing a circuit and corresponding method for reducing standby power and improving no-load to full-load regulation for ringing choke converters. The circuit and corresponding method of the present invention have the advantage of substantially reduced power consumption for no-load and standby power conditions by providing for low switching frequency non-bursting operation or burst mode operation during these conditions, thereby reducing undesirable switching losses. Burst mode (bursting) operation is operation in a switching mode for a predetermined time separated by a longer interval where no switching occurs.

Another advantage of the present invention is that it provides improved no-load to full-load output voltage regulation using an open feedback loop system by maintaining a shorter duty cycle, with longer turn-off time at no-load, while maintaining the output voltage swing closer to the full-load level. The reduced duty cycle provided by the present invention prevents the output voltage from swinging high with respect to the full-load level, thereby providing good no-load and full-load output regulation even in open feedback loop systems.

Still another advantage of the present invention is that it provides for a very low no-load switching frequency and duty cycle by increasing the turn off time of the main switch through use of a turn off transistor driven by a zener diode, thereby maintaining conduction even with a very small base current and prolonging the off time of the main switch.

Yet another advantage of the present invention is that it provides the above advantages through the use of simpler, low cost discrete components, instead of more costly integrated circuits.

Broadly stated, the present invention provides a method of providing no-load to full-load regulation and reducing the power consumption under low-load or no-load conditions of a power converter in an open feedback loop system using a first switch to control current flow through the primary winding of a transformer, comprising the steps of: providing an output to a secondary winding of the transformer through self-oscillation; increasing the turn off time of the first switch at no-load via a second switch driven by a zener diode; maintaining the zener diode in conduction via a first capacitor charged by an auxiliary winding of the transformer; and maintaining conduction of the second switch using a very small control current so as to prolong the off time of the first switch such that a reduced duty cycle with longer off time of the first switch is maintained at no-load and to substantially reduce the difference between the output voltage under low-load or no-load and the corresponding output voltage under a full-load condition.

Broadly stated, the present invention also provides a DC-DC converter having first and second input terminals to which an input DC voltage is coupled and two output terminals where the output DC power is provided, comprising a transformer comprising a primary winding, a secondary winding, and an auxiliary winding, each winding having a first and second end, the secondary winding coupled to the output terminals; a first switch for controlling current flow through the primary winding, the first switch having a control input and one end connected to the primary winding and the other end coupled to the second input terminal, wherein an output to the secondary winding is provided through self-oscillation and wherein the auxiliary winding is coupled between the second input terminal and the control input; a first capacitor charged by the auxiliary winding during the off time of the first switch until the energy of the transformer is depleted; a control circuit comprising a second switch connected between the control input of the first switch and the other end of the first switch, the second switch having a control input; and a second capacitor connected between the control input of the first switch and the control input of the second switch; and a zener diode connected in series with the first capacitor between the second input terminal and the control input of the second switch; wherein the first capacitor is charged by the auxiliary winding so as to maintain the zener diode in conduction causing the second switch to maintain a conduction state so as to extend the turn off time of the first switch during a low load or no-load condition.

BRIEF DESCRIPTION OF THE DRAWINGS

The foregoing aspects and the attendant advantages of the present invention will become more readily appreciated by reference to the following detailed description, when taken in conjunction with the accompanying drawings, wherein.

DETAILED DESCRIPTION OF THE INVENTION

The present invention overcomes the drawbacks of the known RCC circuits and their methods of operation by significantly reducing no-load and standby power consumption and improving no-load to full-load regulation. In a preferred embodiment, the reduction in power consumption and the improved load regulation are achieved through the use of basic, discrete components in the converter circuit. The present invention provides improved output load regulation in open-loop operation. Alternatively, the circuit and method of the present invention may be utilized in closed-loop systems that otherwise exhibit undesirable power consumption at no-load and standby power conditions.

Figure 2:
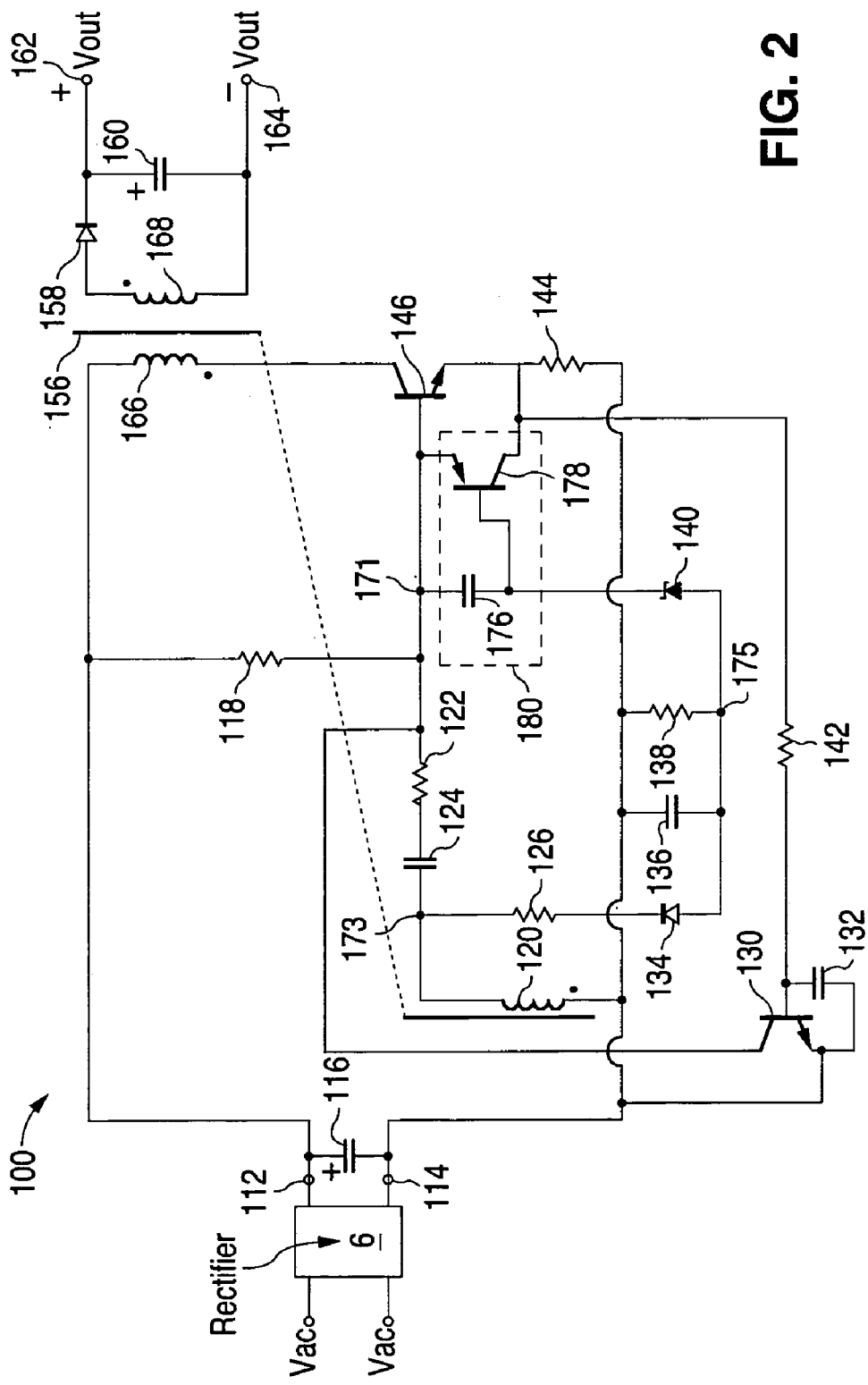
FIG. 2 is a schematic diagram of an embodiment of a circuit according to the present invention.

The present invention is illustrated with reference to FIGS. 2–7. FIG. 2 is a schematic diagram of a preferred embodiment of the circuit and corresponding method according to the present invention. For converter 100 in FIG. 2, an input AC voltage from an external AC source (not shown) is preferably transformed through a diode bridge 6 into DC power at input terminals 112 and 114. The power converter 100 includes a transformer 156 having a primary winding 166, a secondary winding 168, and an auxiliary winding 120. One end of a primary winding 166 is connected to the input terminal 112 to which the DC voltage is coupled.

The other end of primary winding 166 is connected to the collector of main switch 146. Main switch 146 is preferably an NPN transistor, as shown in FIG. 2. Alternatively, main switch 46 may be a MOSFET or other suitable switching element. The emitter of main switch 146 is coupled through a resistor 144 to negative input terminal 114. The output of secondary winding 168 is connected to the output terminals 162 and 164 of converter 100 via a rectifying/smoothing circuit that includes a diode 158 and a capacitor 160 connected in a conventional way. The diode 158 having an anode connected to one end of the secondary winding 168 and a cathode connected to the output terminal 162. The other end of the secondary winding is connected to output terminal 164. The capacitor 160 is connected across the output terminals 162, 164.

Energy is stored in primary winding 166 during the on time of main switch 146. The on time of main switch 146 is controlled by the signal coupled to the base of main switch 146, i.e, its control input, at a node 171. Auxiliary winding 120 has the same polarity as primary winding 166. One end of auxiliary winding 120 is connected to negative input terminal 114. A resistor 122 is connected in series with a capacitor 124 between the base of main switch 146, at node 171, and the other end of auxiliary winding 120, at a node 173.

The power converter 100 includes a resistor 118 connected in series between the input terminal 112 and the control input of main switch 146. A switch 130 is coupled between input terminal 114 and the control input of main switch 146. Switch 130 is preferably an NPN transistor whose base is its control input. Switch 130 has an emitter connected to input terminal 114 and a collector connected to the control input of switch 146. A capacitor 132 is connected across the base and emitter of transistor 130. A resistor 142 is connected in series between the base of transistor 130 and the junction of a resistor 144 and the emitter of main switch 146.

A capacitor 136 is connected in parallel with a resistor 138, between a node 175 and input terminal 114. A resistor 126 is connected in series with a diode 134 between the node 175 and the end of auxiliary winding 120 at node 173. Diode 134 has an anode connected to node 175 and a cathode connected to resistor 126. A zener diode 140 has an anode connected to node 175.

A control circuit 180 is coupled between the cathode of zener diode 140 and the base of switch 146. Control circuit 180 includes a switch 178 and a capacitor 176. As seen in FIG. 2, switch 178 is preferably a PNP transistor whose base is its control input. Switch 178 is connected between the base and emitter of main switch 146. In other words, the emitter of the switch 178 is connected, at a node 171, to the base of main switch 146, and the collector of the switch 178 is connected to the emitter of main switch 146. A capacitor 176 is connected across the base and emitter of switch 178. One end of the capacitor is connected to the cathode of zener diode 140 and the other end is connected to the base of main switch 146, at node 175. Zener diode 140 has an anode connected to node 175 and a cathode connected to capacitor 176 and to the base of switch 178. Capacitor 176 is connected across the base and emitter of switch 178.

The operation of the power converter 100 in FIG. 2 will now be described in further detail. At low-load, turn off of main switch 146 begins when $V_{z140}+V_{c176}-V_{c136}$ becomes lower than approx. 0.6V, (the $V_{be}$ of main switch 146) or when $V_{c176}$ is approximately 0.6, (the $V_{be}$ of switch 178), where $V_{z140}$ is the voltage across zener diode 140, $V_{c176}$ is the voltage across capacitor 176, and $V_{c136}$ is the voltage across capacitor 136. In order to ensure burst mode switching operation or, at best, attain a very low switching frequency non-bursting waveform and avoid undesirable switching losses for power converter 100, capacitor 176 must be selected such that the voltage across it, $V_{c176}$, reaches the $V_{be}$ level of switch 178 prior to the time when $V_{z140}+V_{c176}-V_{c136}$ falls below the $V_{be}$ level.

Power converter 200 functions as a burst mode switcher at low-load. The turn off of main switch 146 occurs when switch 178 is conducting due to the voltage across capacitor 176 ($V_{c176}$), being approximately at the $V_{be}$, 0.6V, of switch 178. During the off time of main switch 146, the capacitor 136 is charged by auxiliary winding 120 until transformer 156 stored energy is depleted. Since capacitor 136 is charged for a period of time when main switch is turned off, zener diode 140 connected in series with capacitor 136, will draw current from auxiliary winding 120, via capacitor 136, thereby charging capacitor 176 in order to maintain the conduction state of switch 178.

Capacitor 136, while discharging through resistor 138, sustains the conduction of zener diode 140. Zener diode 140 continues to draw current as long as capacitor 136 has sufficient charge to overcome the breakdown voltage of zener diode 140 and sustain the conduction state of switch 178. Switch 178 continues conducting, keeping switch 146 turned off, even with a very small current from zener diode 140. Switch 178 requires only a minimal base current in order to prevent main switch 146 from conducting, thereby ensuring a longer turn off at low-load.

Figure 1:
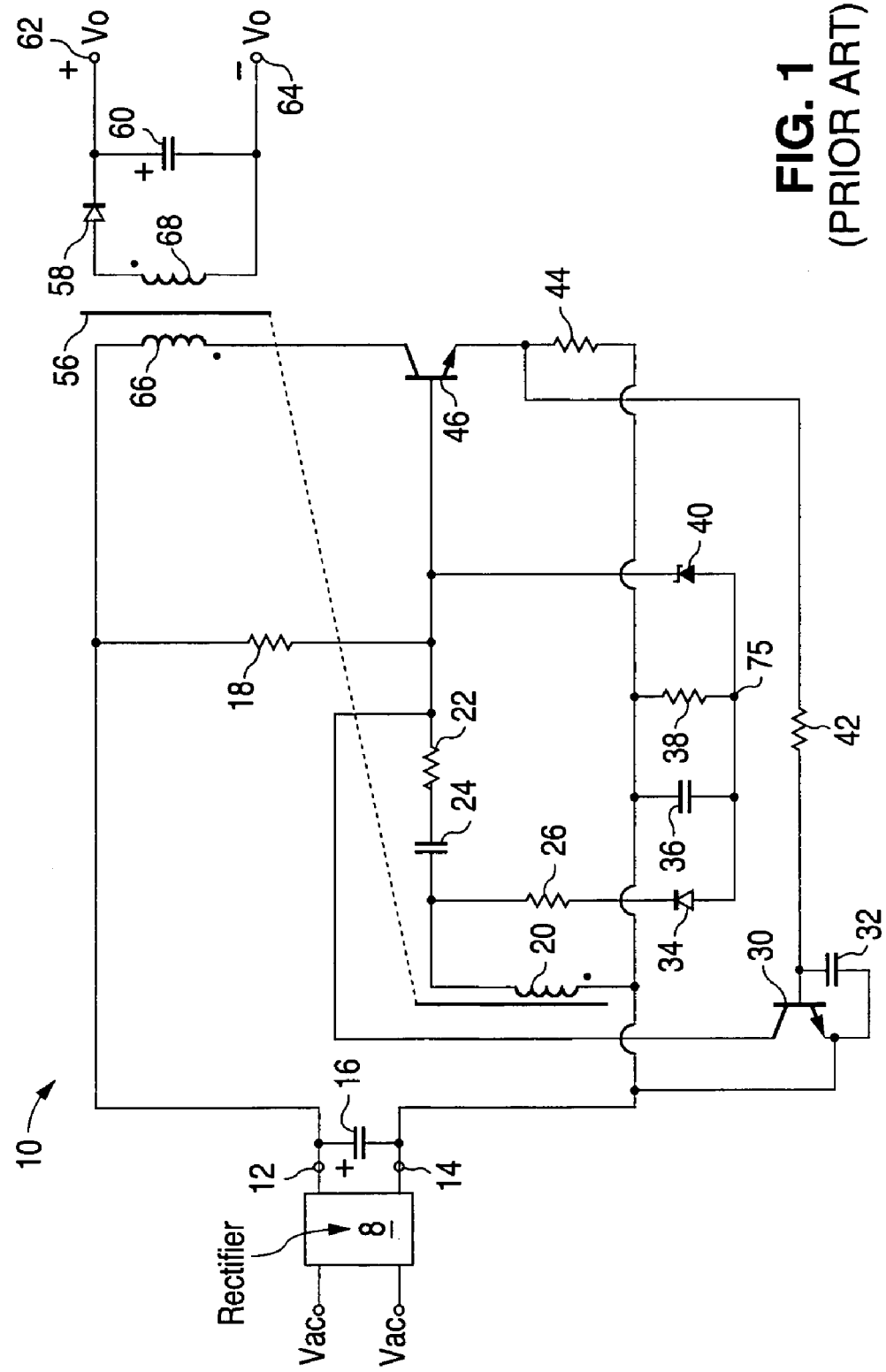
FIG. 1 is a schematic diagram of a prior art ringing choke converter designed for open loop operation.

The circuit and corresponding method of the present invention as shown in FIG. 2 includes the control circuit 180 coupled between zener diode 140 and the base of main switch 146, instead of merely coupling the zener diode to the base as shown in the prior art converter 100 in FIG. 1. A drawback of using the zener diode connected directly to the base of the main switch as shown in FIG. 1, is that, when the current flowing through the zener diode is already reduced as the capacitor 136 (capacitor 36 in FIG. 1) voltage level drops, the zener diode 40 in FIG. 1 can no longer prevent the main switch from conducting again. By contrast, for converter 100 with control circuit 180 as shown in FIG. 2, the turn off time of main switch 146 is extended since, even with a very small current through zener diode 140, the conduction state of switch 178 can be maintained, thereby prolonging the off time of main switch 146.

When the potential on capacitor 136 is no longer sufficient to keep zener diode 140 on and drawing current, capacitor 176 discharges through switch 178 until switch 178 no longer turns off main switch 146, thereby enabling the start of a new switching cycle. The potential at the capacitor 136 and the output voltage, $V_o$, is in accordance with the following formulas:

$$V_{c136} = V_{z140} + V_{c176} - V_{be}$$

and $$V_o = V_{c136} * (N_{s1}/N_{c1})$$

where $N_{s1}$ is the number of turns of secondary winding 168, and $N_{c1}$ is the number of turns of auxiliary winding 120.

To further illustrate the switching cycle at low-load for the circuit and corresponding method of the preferred embodiment in FIG. 2, the sequence is further detailed below:

1) Switch 146 turns on.
2) Capacitor 176 charges via current passing thru zener diode 140.
3) Switch 178 turns on when voltage at capacitor 176 reaches~0.6V ($V_{be}$ level).
4) Switch 146 turns off.
5) Capacitor 136 is charged by auxiliary winding 120 through diode 134 until the transformer energy is depleted. Once the transformer energy is depleted, capacitor 136 discharges through resistor 138. From the basic flyback converter voltage relationship, $V_o = V_{in} * (N_{s1}/N_{p1}) * (T_{on1}/T_{off1})$, where $N_{p1}$ is the number of turns of primary winding 166, $T_{on1}$ is the turn on time and $T_{off1}$ is the turn off time of main switch 146. Since the voltage across resistor 126 is negligible and the voltage drops due to diode 134 and diode 158 cancel each other, $V_{c136}$ will be equal to $V_o*(N_{c1}/N_{s1})$. As a result, the regulation of the $V_{c136}$ level results in control of $V_o$. In order to regulate $V_{c136}$, zener diode 140, switch 178, and capacitor 176 function to limit the conduction state of main switch 146. Main switch 146 turns off once switch 178, driven by zener diode 140, conducts. As a result, the voltage for capacitor 136, $V_{c136}$, is limited according to the formula $V_{c136} = V_{z140} + V_{c176} - V_{be}$; which is approximately, $V_{c136} = V_{z140}$. A higher $V_{c176}$ level will cause a shorter turn on time and a longer off time for main switch 146; thereby providing regulation.

6) Capacitor 176 continues charging until $V_{c136}$ level is below the predetermined conduction threshold of zener diode 140, at which point capacitor 176 begins to discharge. $V_{c176}$ falling below 0.6V and $V_{z140} + V_{c176} - V_{c136} > 0.6V$, causes switch 178 to turn off and switch 146 to turn on, thereby causing the cycle to repeat beginning with step 1). At a high input voltage, a one pulse charge at capacitor 136 may be sufficient to sustain the conduction of zener diode 140 and switch 178 for a long period of time. This will roughly eliminate bursting and keep main switch 146 turned off longer. $V_{c136}$ is maintained by a very low switching frequency/duty cycle of periodic pulses.

As the switching cycle described in steps 1)–6) above continues, capacitor 136 is charged when main switch 146 turns off. After one or a few switching cycles, as the voltage at capacitor 136 rises high enough to sustain the required $V_{z140}$ and $V_{c176}$ levels, switch 178 remains in a conduction state, so as to turn main switch 146 off for a longer time. Zener diode 140 will conduct and continue to conduct as long as $V_{C136}$ is equal to or above the breakdown voltage threshold of zener diode 140. In this state, main switch 146 will remain off until the $V_{z140} + V_{c176} - V_{c136}$ level falls below the 0.6V $V_{be}$ level and $V_{c176}$ can no longer sustain the level of the $V_{be}$ of switch 176 as capacitor 136 discharges to resistor 138 (with the transformer charge already depleted during the first part of the long off time).

The turn off of switch 178 causes main switch 146 to turn on, thereby causing the cycle to repeat beginning with step 1) with main switch 146 turned on.

As seen from the above switching cycle description, power converter 100 provides regulation of the capacitor 136 voltage, $V_{c136}$, and a reduction of switching action. The regulation of $V_{c136}$ also provides control for $V_o$ since, as shown above, $V_o$ is a function of $V_{c136}$.

The decreased switching action/frequency provided by the present invention significantly minimizes the largest power losses at light-load, i.e., those caused by the losses at main switch 146 and transformer 156. Consequently, since the off time provided by the present invention is much longer than for the prior art, the no-load output voltage drift is reduced, thereby minimizing the no-load to full-load $V_o$ level difference (providing nearly flat $V_o$ regulation) even without closing the feedback loop.

The standby power consumption for converter 100 has been measured as only reaching up to 50 mW, which is substantially below the 300 mW limit mandated by the European Commission Code of Conduct on Efficiency of External Power Supplies. The standby power consumption of converter 100 is also substantially below the power consumption for the prior art converters such as that shown in FIG. 1.

At a loaded condition, the output voltage ($V_o$) and the voltage at capacitor 136 are limited by the switch 130 which, for this condition, has the dominant control on the maximum conversion power. With increased output load, the control by switch 178 of the state of switch 146 diminishes while the effect of the switch 130 increases. The switch 130 is also part of the over current protection provided by power converter 100 when there is excessive load at the output. The peak voltage at secondary winding 168 is reflected on resistor 144. The resistors 144 and 142 are selected so as to cause switch 130 to turn on during the over current condition, thereby turning of main switch 146.

Figure 3:
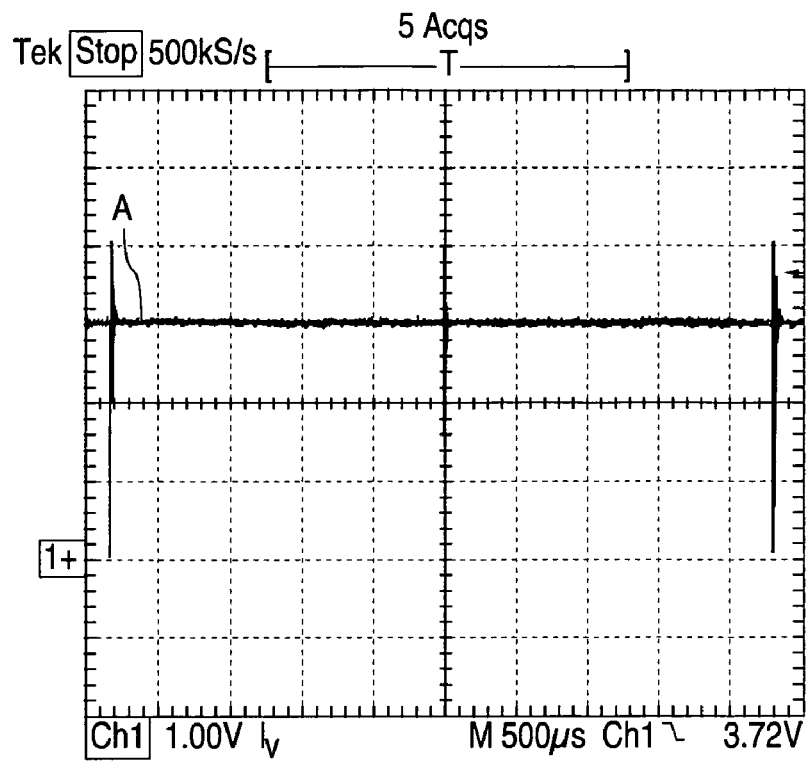
FIG. 3 illustrates a waveform for the voltage across the main switch at no-load for an exemplary circuit according to an embodiment of the present invention.
Figure 4:
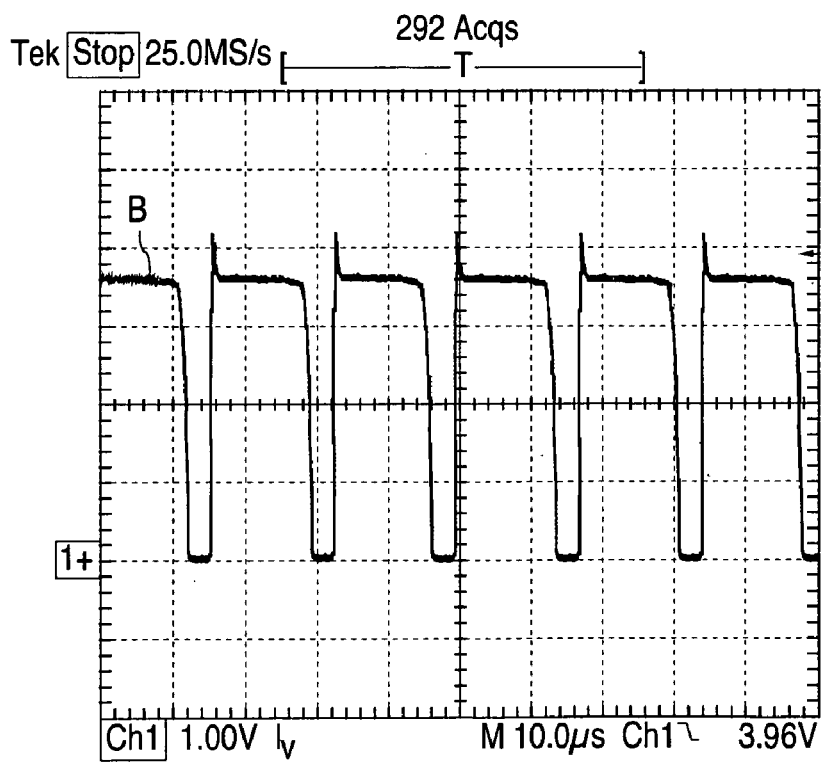
FIG. 4 illustrates a waveform for the voltage across the main switch at a rated load for an exemplary circuit according to an embodiment of the present invention.

FIG. 3 illustrates a waveform A for the voltage across the main switch at no-load for an exemplary circuit according to an embodiment of the present invention. FIG. 4 illustrates a waveform A1 for the voltage across the main switch at a rated load for an exemplary circuit according to an embodiment of the present invention. For FIGS. 3–4, the measurements were taken for an input AC of 230 Vac. The output voltage, Vo (not shown) was measured at 6.7 V for the no-load condition, and at 4.7 volts for the rated load condition. The exemplary rated load was 400 mA. As can be seen from FIGS. 3–4, the switching frequency has been reduced considerably at no-load due to the prolonging of the main switch's off time according to the present invention, thereby reducing power consumption. As seen in FIG. 3, for an exemplary no-load condition, the switching frequency was measured at approximately 400 Hz with the prolonged off time and reduced duty cycle as shown. By contrast, for the rated load condition shown in FIG. 4, the switching frequency was measured at approximately 58 KHz. Measurements were also taken for a 10% load (40 mA) condition (not shown) wherein the switching frequency was measured at 400 Hz (during each switching burst) with $V_o$ at 5.6V.

Figure 5:
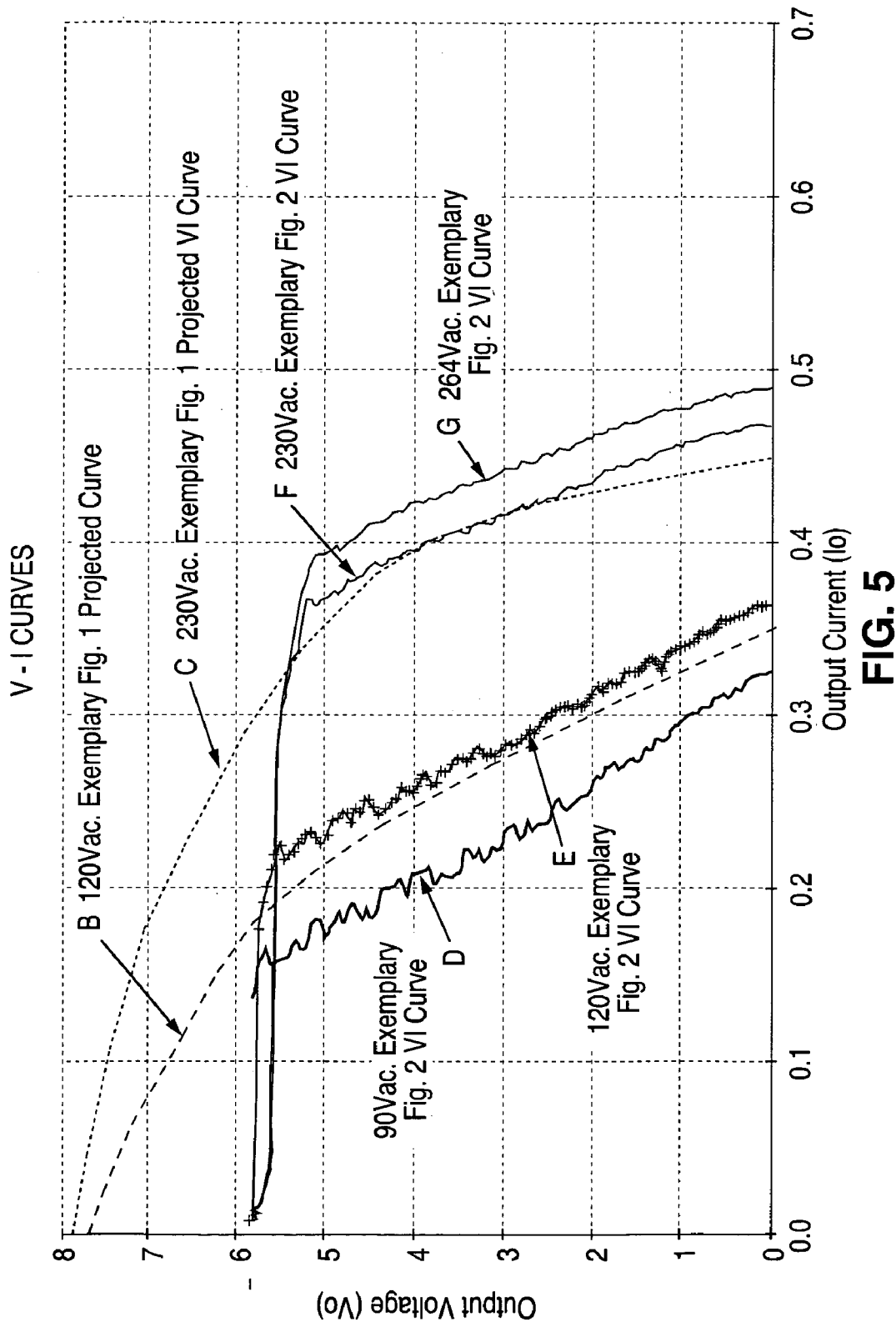
FIG. 5 illustrates exemplary voltage versus current (V-I) waveforms for selected AC line voltages for an exemplary circuit of FIG. 1 and for an exemplary circuit according to the embodiment of the present invention in FIG. 2.

FIG. 5 illustrates exemplary waveforms for output voltage ($V_o$) versus output current ($I_o$) (V-I) waveforms for selected AC line voltages for an exemplary prior art circuit of FIG. 1 (Traces B and C) and for an exemplary circuit according to the embodiment of the present invention in FIG. 2 (Traces D–G). Trace B is a waveform for an input AC voltage of 120 Vac for the exemplary prior art circuit of FIG. 1. Trace C is a waveform for an input AC voltage of 230 Vac for the exemplary prior art circuit of FIG. 1. Trace D is a waveform for an input AC voltage of 90 Vac for the exemplary circuit according to the embodiment of the present invention in FIG. 2. Trace E is a waveform for an input AC voltage of 120 Vac for the exemplary circuit of FIG. 2. Trace F is a waveform for an input AC voltage of 230 Vac for the exemplary circuit of FIG. 2. Trace G shows a waveform for an input AC voltage of 264 Vac for the exemplary circuit of FIG. 2.

Figure 6:
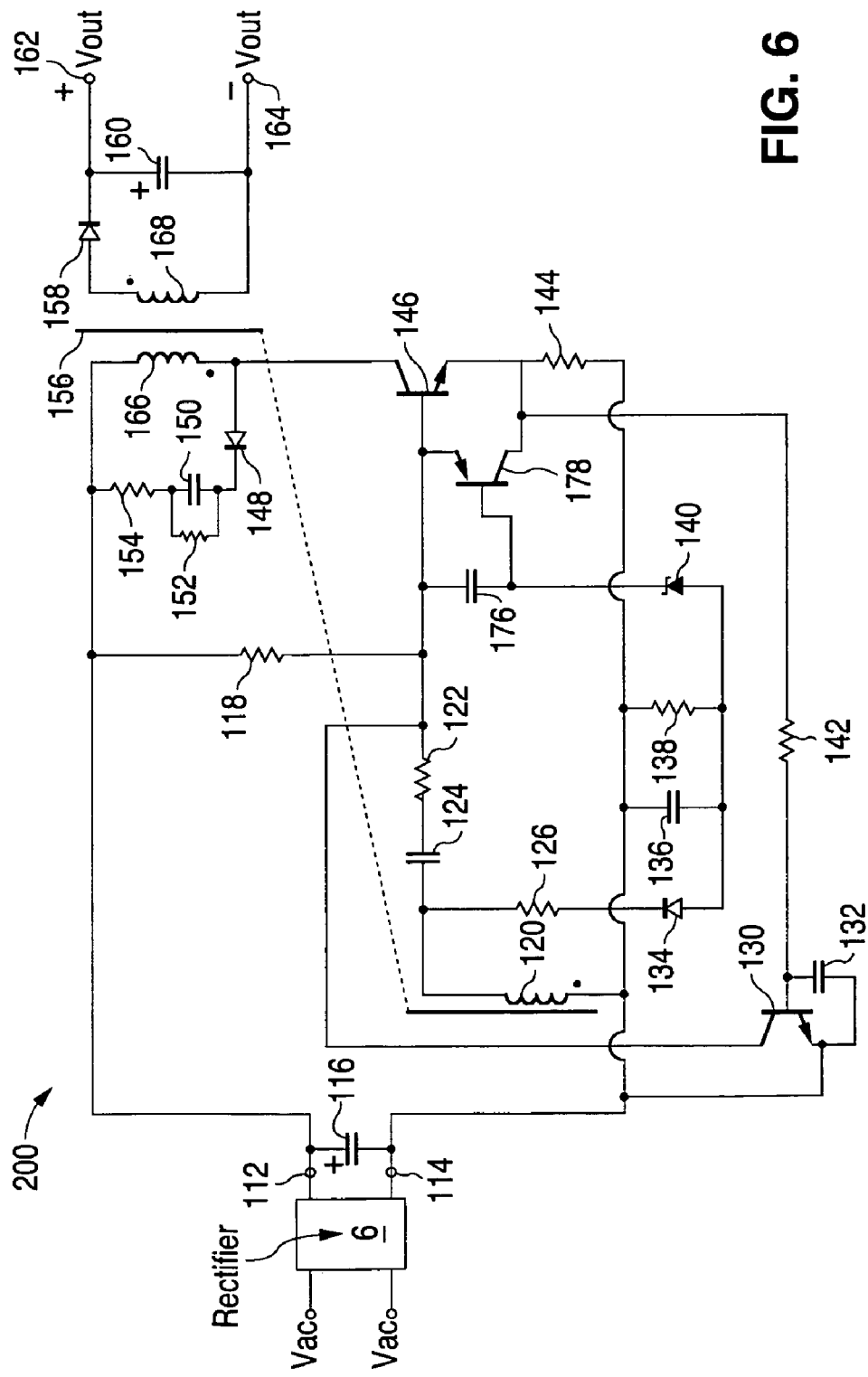
FIG. 6 shows an alternate embodiment of the circuit according to the present invention that includes a snubber circuit.

FIG. 6 shows an alternate embodiment according to the present invention that includes a snubber circuit. The power converter 200 adds a conventional snubber circuit to power converter 100. As seen in FIG. 6, the conventional snubber circuit comprises a series combination of a resistor 154, a parallel combination of a resistor 152 and a capacitor 150, and a diode 148 is connected across primary winding 66.

Figure 7:
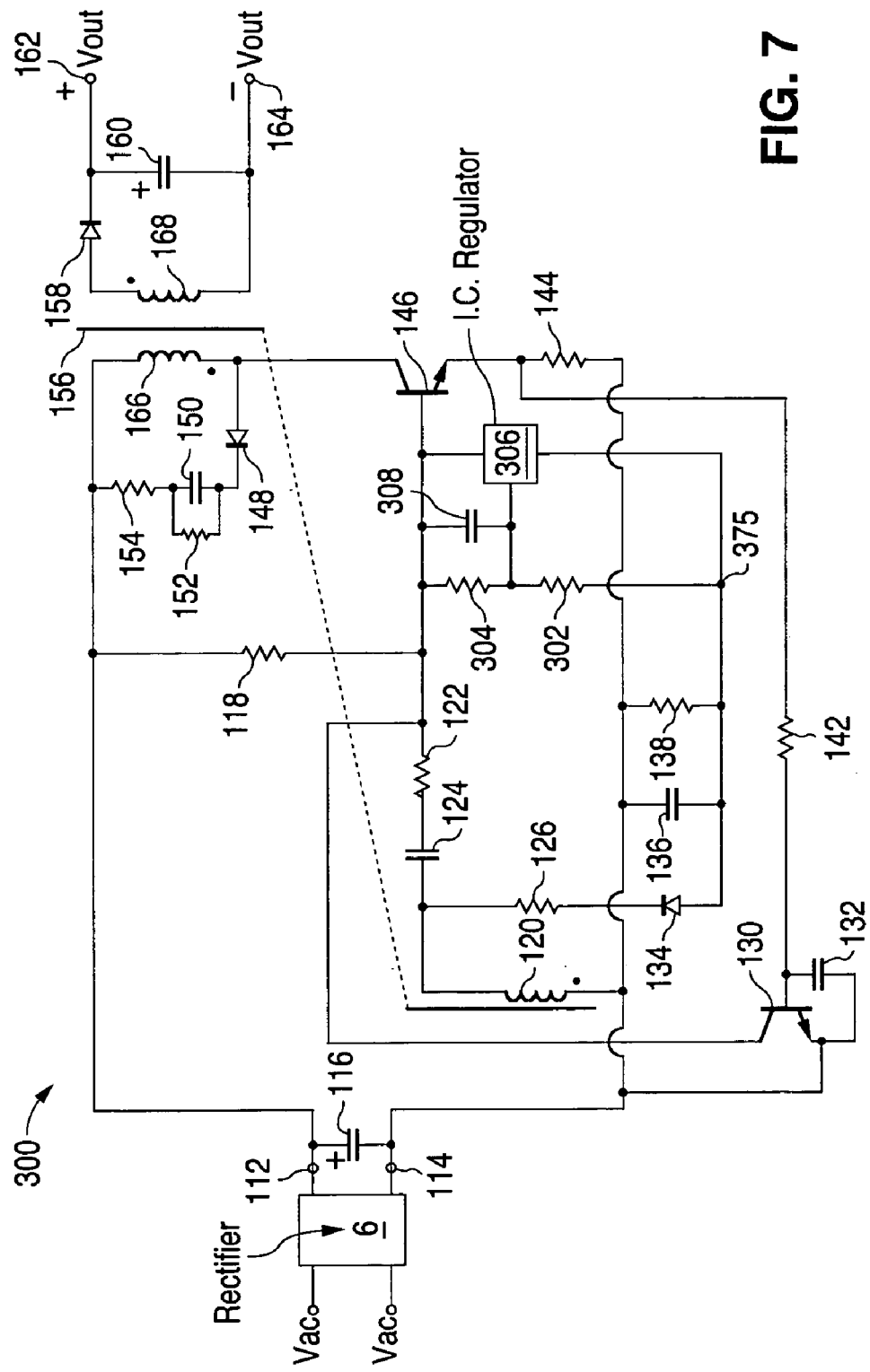
FIG. 7 shows another alternate embodiment of the circuit according to the present invention having an integrated circuit regulator in place of a zener diode and one switching element.

FIG. 7 shows another alternate embodiment according to the present invention having an integrated circuit (IC) regulator 306 in place of a zener diode and one switching element. The integrated circuit is preferably a TL431 regulator. A voltage divider is formed by resistors 302 and 304 connected in series between the control input of main switch 146 and the junction of diode 134, capacitor 136, and resistor 138 at a node 375. The voltage divider provides a reference voltage. One input of the IC regulator 306 is connected to node 375. The divided voltage, at the junction of resistors 302 and 304, is connected to a second input of IC regulator 306 and to one end of a capacitor 308. The other end of capacitor 308 is connected to the control input of main switch 146 and to the output of IC regulator 306. The inclusion of the integrated circuit has the disadvantage, however, of higher cost compared to the embodiments using discrete components as shown in FIGS. 2 and 6.

As seen from the above, the circuit and method of the present invention has the advantage of providing for significant lower power consumption for no-load and low standby power conditions by providing for circuit operation at very low switching/burst frequency during these conditions, thereby reducing undesirable switching losses. The circuit and method of the present invention provides improved no-load to full-load output voltage regulation by maintaining a shorter duty cycle, with longer turn-off time, at no-load, while maintaining the output voltage swing closer to the full-load level. The reduced duty cycle provided by the present invention prevents the output voltage from swinging high with respect to the full-load level so as to maintain good no-load and full-load output regulation, even for open feedback loop systems.

The foregoing detailed description of the invention has been provided for the purposes of illustration and description. Although exemplary embodiments of the present invention have been described in detail herein with reference to the accompanying drawings, it is to be understood that the invention is not limited to the precise embodiments disclosed, and that various changes and modifications to the present invention are possible in light of the above teaching.

What is claimed is:

1. A method of providing no-load to full-load regulation and reducing the power consumption under low-load or no-load conditions of a power converter in an open feedback loop system using a first switch to control current flow through the primary winding of a transformer, comprising the steps of:
   providing an output to a secondary winding of said transformer through self-oscillation;
   increasing the turn off time of the first switch at no-load via a second switch driven by a zener diode;
   maintaining said zener diode in conduction via a first capacitor charged by an auxiliary winding of the transformer; and
   maintaining conduction of said second switch using a very small control current so as to prolong the off time of said first switch such that a reduced duty cycle with longer off time of said first switch is maintained at no-load and to substantially reduce the difference between said output voltage under low-load or no-load and the corresponding output voltage under a full-load condition.

2. The method of claim 1, wherein the output voltage is a function of the voltage across said first capacitor.

3. The method of claim 1, further comprising, when the voltage on said first capacitor is no longer sufficient to keep said zener diode is a conduction state, discharging a second capacitor through said second switch until said second switch no longer turns off said first switch, so as to enable a new switching cycle to begin.

4. The method of claim 1, wherein said power converter has a third switch, wherein, during a loaded condition, the state of said first switch is a function of the conduction state of said third switch.

5. A DC-DC converter having first and second input terminals to which an input DC voltage is coupled and two output terminals where the output DC power is provided, comprising:
   a transformer comprising a primary winding, a secondary winding, and an auxiliary winding, each winding having a first and second end, said secondary winding coupled to said output terminals;
   a first switch for controlling current flow through said primary winding, said first switch having a control input and one end connected to said primary winding and the other end coupled to said second input terminal, wherein an output to said secondary winding is provided through self-oscillation and wherein said auxiliary winding is coupled between said second input terminal and said control input;

a first capacitor charged by said auxiliary winding during the off time of said first switch until the energy of said transformer is depleted;

a control circuit comprising:
  a second switch connected between said control input of said first switch and the other end of said first switch, said second switch having a control input; and
  a second capacitor connected between the control input of said first switch and the control input of said second switch; and a zener diode connected in series with said first capacitor between said second input terminal and the control input of said second switch;

wherein said first capacitor is charged by said auxiliary winding so as to maintain said zener diode in conduction causing said second switch to maintain a conduction state so as to extend the turn off time of the first switch during a low load or no-load condition.

6. The converter of claim 5, wherein the output voltage is a function of the voltage across said first capacitor.

7. The converter of claim 5, wherein the first end of said auxiliary winding is connected to said second input terminal, said converter further comprising a series combination of a third capacitor and a resistor connected between the second end of said auxiliary winding and the control input of said first switch.

8. The converter of claim 7, further comprising a series combination of a diode and first resistor, said series combination is connected in series with said first capacitor across said auxiliary winding.

9. The converter of claim 5, further comprising a third switch connected in series between said second input terminal and the control input of said first switch, and a resistor connected in series between the other end of said first switch and said second input terminal, said third switch having a control input controlled as a function of the voltage across said resistor.

10. The converter of claim 9, wherein said first switch and said second switches are NPN transistors, and said third switch is a PNP transistor.

11. The converter of claim 5, wherein said zener diode has an anode and a cathode, and wherein said control circuit is coupled between said cathode and the control input of said first switch.

12. The converter of claim 5, further comprising a series combination of a diode and a resistor, said series combination is connected in series with said first capacitor across said auxiliary winding.

13. The converter of claim 5, further comprising a snubber circuit including a series combination of a first resistor, a second resistor connected in parallel with a third capacitor, and a diode, said series combination connected across said primary winding.

14. The converter of claim 5, wherein the input DC voltage is an unregulated voltage generated by a rectifier fed from a source of AC power.

15. The converter of claim 5, further comprising a smoothing circuit comprising a diode having an anode connected to one end of said secondary winding and a cathode connected to one output terminal, the other end of said secondary winding is connected to the other output terminal, and a third capacitor connected across both output terminals.

16. In a DC-DC converter having first and second input terminals to which an input DC voltage is coupled and two output terminals where the output DC power is provided having a transformer comprising a primary winding, a secondary winding, and an auxiliary winding, each winding having a first and second end; said secondary winding coupled to said output terminals, a first end of said auxiliary winding is connected to said second input terminal, a first switch connected in series with a first resistor and said primary winding across said first and second input terminals; said first switch having a control input and one end connected to said primary winding and the other end coupled to said second input terminal, wherein an output to said secondary winding of said transformer is provided through self-oscillation; wherein said auxiliary winding is coupled between said second input terminal and said control input, the first end of said primary winding is connected to said first input terminal; a first capacitor connected in series with a second resistor between the second end of said auxiliary winding and the control input of said first switch, a third resistor connected in series between said first input terminal and the control input of said first switch, a second switch having a base, a collector connected to the control input of said first switch and an emitter terminal connected to the second input terminal, a second capacitor connected across the base and emitter of said second switch, a fourth resistor connected in series between the base of said second switch and the junction of said first resistor and the second end of said first switch, a third capacitor connected in parallel with a fifth resistor between a first node and the second input terminal, a first diode connected in series with a sixth resistor between said first node and the second end of said auxiliary winding, said first diode having an anode connected to said first node and a cathode connected to said sixth resistor, and a zener diode having an anode connected to said first node and a cathode, and a fourth capacitor connected between said input terminals, a control circuit comprising:

a third switch connected between said control input of said first switch and a second end of said first switch; said third switch having a control input; and
  a fifth capacitor connected between the control input of said first switch and the control input of said third switch, said fifth capacitor having one end connected to the cathode of said zener diode and the other end connected to the control input of said first switch; and
  wherein said third capacitor is charged by said auxiliary winding so as to maintain said zener diode in conduction causing said third switch to maintain a conduction state so as to extend the turn off time of the first switch during a no-load condition, and
  wherein when a voltage on said third capacitor is no longer sufficient to keep said zener diode is a conduction state, said fifth capacitor discharges through said third switch until said third switch no longer turns off said first switch, so as to enable a new switching cycle to begin.

17. The control circuit of claim 16, wherein said first switch is an NPN transistor having a base, a collector, and an emitter terminal, wherein the collector terminal of said first switch is connected to the second end of said first switch and the emitter terminal is connected to one end of said first resistor, and wherein said third switch is an PNP transistor having a base, a collector, and an emitter terminal, wherein the emitter terminal of said third switch is connected to the control input of the first switch, and wherein said third switch is an PNP transistor having a base, a collector, and an emitter terminal, wherein the emitter terminal of said third switch is connected to the base terminal of the first switch and the collector terminal of said third switch is connected to emitter terminal of the first switch.

18. The control circuit of claim 16, wherein said converter further includes a snubber circuit comprising a series combination of a seventh resistor, a parallel combination of a eighth resistor and a seventh capacitor, and a third diode, said series combination connected across said primary winding; wherein one end of said seventh resistor is connected to a junction of said first input terminal and the first end of said primary winding, and said third diode has an anode connected to the second end of said primary winding.

19. A DC-DC converter having first and second input terminals to which an input DC voltage is coupled and two output terminals where the output DC power is provided, comprising:
  a transformer comprising a primary winding, a secondary winding, and an auxiliary winding, each winding having a first and second end, said secondary winding coupled to said output terminals;
  a first switch for controlling current flow through said primary winding, said first switch having a control input and one end connected to said primary winding and the other end coupled to said second input terminal, wherein an output to said secondary winding is provided through self-oscillation and wherein said auxiliary winding is coupled between said second input terminal and said control input;
  a first capacitor charged by said auxiliary winding during the off time of said first switch until the energy of said transformer is depleted;
  a control circuit comprising:
    a voltage divider formed by a first and second resistor connected in series between the control input of said first switch and a first node and generating a divided voltage;
    an integrated circuit regulator having a first input connected to said first node, the divided voltage applied to a second input, and an output connected to the control input of said first switch;
    a second capacitor connected between the control input of said first switch and the second input of said integrated circuit regulator;
  wherein said first capacitor is charged by said auxiliary winding so as provide a voltage to said first input, said integrated circuit regulator responsive to said first and second inputs to extend the turn off time of the first switch during a low load or no-load condition.

20. The converter of claim 19, wherein said integrated circuit regulator is a TL431 regulator.

21. The converter of claim 19, wherein, during a loaded condition, the state of said first switch is a function of the conduction state of a third switch.

22. The converter of claim 21, further comprising a smoothing circuit coupled between said secondary winding and said output terminals for smoothing said output voltage and a snubber circuit connected across said primary winding.

* * * * *